United States Patent
Matsumoto et al.

(10) Patent No.: US 11,276,286 B2
(45) Date of Patent: Mar. 15, 2022

(54) DETECTABLE FOLDED COIL

(71) Applicant: CHECKPOINT SYSTEMS, INC., Thorofare, NJ (US)

(72) Inventors: Takeshi Matsumoto, Kouza-gun (JP); Kenichiro Uemizu, Hiratsuka (JP)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 16/623,580

(22) PCT Filed: Jun. 22, 2018

(86) PCT No.: PCT/US2018/039026
§ 371 (c)(1),
(2) Date: Dec. 17, 2019

(87) PCT Pub. No.: WO2018/237281
PCT Pub. Date: Dec. 27, 2018

(65) Prior Publication Data
US 2020/0211349 A1 Jul. 2, 2020

Related U.S. Application Data

(60) Provisional application No. 62/523,676, filed on Jun. 22, 2017.

(51) Int. Cl.
*G08B 13/24* (2006.01)
*G06K 19/077* (2006.01)

(52) U.S. Cl.
CPC ... *G08B 13/2408* (2013.01); *G06K 19/07779* (2013.01); *G08B 13/2414* (2013.01); *G08B 13/2431* (2013.01); *G08B 13/2442* (2013.01)

(58) Field of Classification Search
CPC .......... G06K 19/07779; G08B 13/2408; G08B 13/2414; G08B 13/2431; G08B 13/2437; G08B 13/2442
See application file for complete search history.

(56) References Cited

U.S. PATENT DOCUMENTS 4,654,641 A  3/1987  Ferguson et al.
5,576,693 A * 11/1996  Tyren ............... G01B 7/003
                                              340/551
(Continued)

FOREIGN PATENT DOCUMENTS

EP  0609957  8/1994
EP  0807912  11/1997
(Continued)

OTHER PUBLICATIONS

Patent Cooperation Treaty (PCT), International Search Report and Written Opinion for Application PCT/US2018/039026 filed Jun. 22, 2018, dated Nov. 27, 2018, International Searching Authority, EP.

*Primary Examiner* — Mirza F Alam
(74) *Attorney, Agent, or Firm* — McDonald Hopkins LLC

(57) ABSTRACT

A folded coil label and associated methods of making a folded coil label are provided. On example folded core label may include a core, a coil, and a capacitor. The coil may be wrapped around the core and connected to the capacitor to form a resonant circuit. The coil may be formed of angled traces wrapped around the core to form turns of the coil, and each angled trace may be electrically and physically connected in series to an adjacent angled trace to form a helical structure of the coil.

22 Claims, 18 Drawing Sheets

(56) References Cited

U.S. PATENT DOCUMENTS

2002/0097153 A1* 7/2002 Youbok .............. G06K 19/0726
340/572.5
2005/0007296 A1* 1/2005 Endo ................ G06K 19/07749
343/895
2006/0255945 A1* 11/2006 Egbert ............. G06K 19/07749
340/572.7

FOREIGN PATENT DOCUMENTS

WO          200017835       3/2000
WO          WO-0017835 A1 *  3/2000  ........... G08B 13/244

* cited by examiner

DETECTABLE FOLDED COIL

CROSS-REFERENCE TO RELATED APPLICATION

This application is a 35 U.S.C. 371 national stage filing and claims priority to International Application No. PCT/US2018/039026 entitled "DETECTABLE FOLDED COIL," filed on Jun. 22, 2018, which claims priority to U.S. Provisional Patent Application No. 62/523,676 entitled "DETECTABLE FOLDED COIL," filed on Jun. 22, 2017, each of which are incorporated herein by reference in their entirety.

TECHNICAL FIELD

The present disclosure relates to radio frequency (RF) devices and methods, and more specifically to RF resonant labels for electronic article surveillance.

BACKGROUND

RF labels are commonly used in a number of settings, including in retail loss prevention. In this regard, retail theft prevention systems, often referred to as electronic article surveillance (EAS) systems, use antennas located at the exits of a retail establishment to detect RF labels that are affixed to sale items. An RF label may be affixed to a sale item, and if the label is not deactivated at a point-of-sale during a sales transaction, an EAS system will detect the RF label when the RF label is in within range of the EAS system. The EAS system is often disposed near the exit of a store so that the range monitors for RF labels leaving the store.

For instance, the EAS system uses a transmitter to emit a signal at a predetermined RF frequency. The RF label is tuned to the predetermined frequency so that it responds to the signal and a receiver detects the RF label response. This response can then be used for determining whether to set off an alarm or not. An alarm may be triggered because the removal of an active RF label from the retail establishment is likely to be associated with an attempted theft. Because the RF labels are affixed to external surfaces of the items, the size of the labels is a concern because the labels can obscure product packaging and information.

However, there remains a need to provide RF labels capable of detection on different types of sales items. Moreover, there is a need for more efficient, effective, and compact RF labels.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

According to various example embodiments, a folded coil label is provided. A folded coil label may be constructed in relative small size dimensions. An example folded label may comprise a core, a coil, and a capacitor. The core may include a ferrite. According to some example embodiments, the core may include a ferrite and a spacer comprised of, for example, paper. According to some example embodiments, the core may be comprised of a first layer including a ferrite, a second layer including a spacer, and a third layer including a ferrite. In some other examples, the core may include ferrite and no spacer.

The coil may be formed by a conductor that follows a helical path around the coil. The coil may be formed by wrapping angled traces formed on an etched conductive sheet around the core and welding the traces in series to form the coil as a helix. A first end of the coil may be connected to a first plate of the capacitor and a second end of the coil may be connected to a second plate of the capacitor. In this regard, the capacitor may comprise two parallel plates that are formed on either side of a dielectric layer. According to some example embodiments, the capacitor may include a deactivation spot.

Also described herein is a foldable label comprising a core, a capacitor comprising a dielectric layer disposed between a top plate and a bottom plate, and a coil wrapped around the core and connected to the capacitor to form a resonant circuit. The coil may be formed of angled traces wrapped around the core to form turns such that each turn is electrically and physically connected in series to an adjacent angled turn to form a helical structure of the coil. The core may comprise at least one ferrite layer and may comprise a spacer layer. The spacer layer may comprise a non-conductive or ferrous flexible member. In some examples, the foldable label may comprise a liner, wherein the resonant circuit is disposed above the liner. At least one metal layer may be disposed between the liner and the resonant circuit. The at least one metal layer may comprise a thickness between about 40-80 microns. At least one spacer layer may be disposed between the liner and the resonant circuit. The at least one spacer layer may comprise a mass per unit area of between about 160 to 500 $g/m^2$. It is noted that the foldable label may comprise at least one spacer layer disposed between the liner and the resonant circuit independent of a metal layer. For instance, wherein a space between the resonate circuit and the liner may be free of metal. Moreover, a space between the resonate circuit and the liner may be free of metal and the core may be free of metal, such that the label comprises no metal other than the coil. For instance at least a portion of the top plate may be disposed between the core and the liner. Moreover, the resonate circuit may comprise a laser tuned resonant circuit.

In some embodiments, a foldable label may comprise a core, a capacitor comprising a dielectric layer disposed between a top plate and a bottom plate, a coil wrapped around the core and connected to the capacitor to form a resonant circuit, a liner disposed beneath the resonant circuit, and at least one metal layer disposed between the liner and the resonant circuit, wherein the at least one metal layer comprises a thickness between about 40-80 microns. In at least one example, the bottom plate is generally coplanar with a bottom of the coil. In another aspect, the capacitor is horizontally adjacent to the coil.

In another aspect, a foldable label may comprise a resonant circuit comprising, a core comprising a ferrite material, a capacitor comprising a dielectric layer disposed between a top plate and a bottom plate, a coil comprising angled traces that wrap around the core, and welds operatively coupled adjacent angles traces together to form a generally helical shaped coil, a liner disposed beneath the resonant circuit, and at least one metal layer disposed between the liner and the resonant circuit. The top plate may be disposed at least partially below the core. In another aspect, the bottom plate is disposed at least partially below the core. It is noted that the dielectric layer may form at least a portion of the coil.

The following description and the drawings disclose various illustrative aspects. Some improvements and novel aspects may be expressly identified, while others may be apparent from the description and drawings.

DESCRIPTION OF THE DRAWINGS

The present teachings may be better understood by reference to the following detailed description taken in connection with the following illustrations, wherein.

DETAILED DESCRIPTION

Figure 1A:
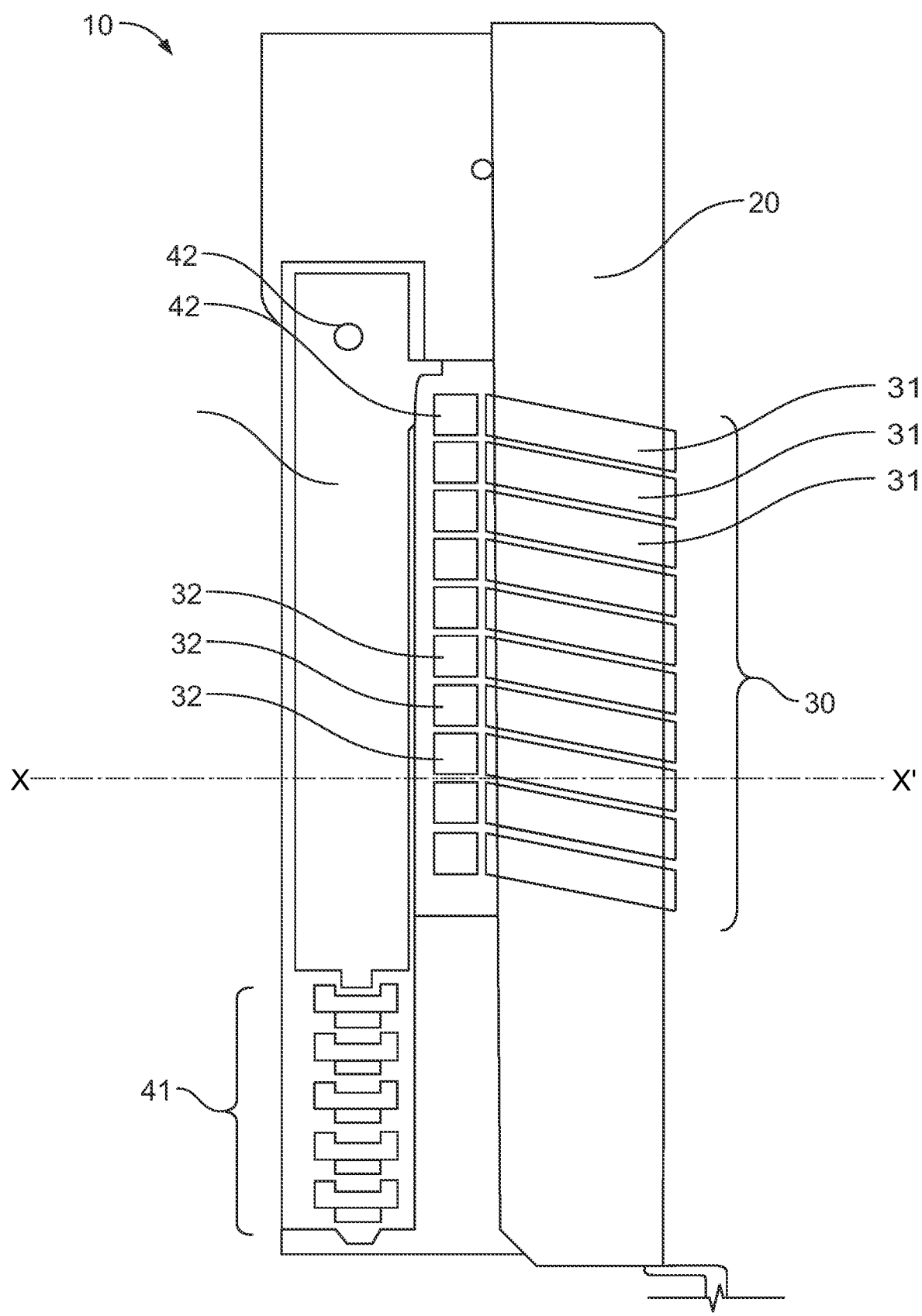
FIG. 1A is a top view of a foldable label in accordance with various disclosed aspects

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "label," "RF label," "tag," and the like may be used interchangeably, unless context suggests otherwise or warrants a particular distinction among such terms. It is further noted that RF labels may be chosen based on a frequency (e.g., low frequency RF label for close communication). Identification tags may comprise printable RF labels, RF labels that include microchips, or the like. RF labels can contain stored information, such as in a memory (e.g., read-only memory (ROM), random access memory (RAM), electrically erasable programmable read-only memory (EEPROM), or various other types of memory). In another aspect, an RF label may be powered by electromagnetic induction from magnetic fields produced by a transmitter/receiver. For instance, an RF label may include an EAS label tuned for a specific frequency. The label may include an antenna and may comprise various materials, such as aluminum.

In an example, an RF label may include a circuit and a liner. The circuit may be adhered or attached to the liner. The liner may be removed to allow the RF label to be attached to a sale item or article. It is noted that RF labels may be attached to various types of articles unless context suggests otherwise or a particular distinction is made. For instance, RF labels may be attached to paper, plastic, metal, cardboard, cloth, or the like. Moreover, RF labels may be utilized in traditional physical stores, online stores, or other types of retailers. As described herein, the RF label may be a passive transponder that collects energy from interrogating radio waves.

In some traditional systems, RF labels may not be detectable when attached to certain products, such as metal products or products containing metal. Attempts to solve this and other shortcomings have resulted in large and costly labels. Inclusion of one or more of a spacer, ferrite core, or metal layer (e.g., a frequency compensator) may increase the size and cost of such a label as the various components are stacked underneath a standard LC circuit. Moreover, these attempts have resulted in false alarms as the frequency of the label's range to antenna demonstrate high failure rates when the RF labels are attached to metal articles. This may include cans, metal lids, foil wrapped or foil bagged products, and other types of metal objects. The metal of the article may interfere with the RF label's ability to receive or respond to a signal from a receiver/transmitter. Embodiments described here address these and other issues. More particularly, described embodiments provide for foldable labels that create an LC circuit. The LC circuit may be tuned to a particular frequency. The foldable labels may include spacers, metal liners/layers, and structural arrangements that increase detectability or reduce failure rates when attached to metal articles.

Figure 1B:
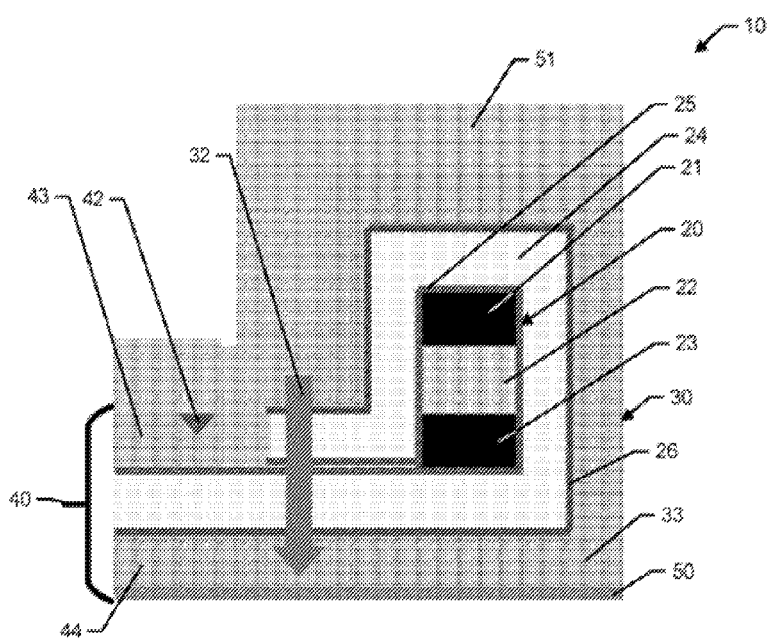
FIG. 1B is a cross-sectional view of the foldable label of FIG. 1A taken along line X-X' in accordance with various disclosed aspects.

FIGS. 1A-1B show an example label 10 according to some example embodiments. In this regard, the label 10 may be comprised of a ferrite core 20, a coil 30, and a capacitor 40. As further described below, the ferrite core 20 may be comprised of multiple layers with a first layer being a ferrite layer, a second layer being a spacer (e.g., a non-conductive or ferrous flexible member), and a third layer being another ferrite layer. The spacer may comprise, for example, a paper or a synthetic paper. The ferrite layers may be formed of a flexible ferrite to increase the label's physical flexibility.

The coil 30 may be formed of a conductive material (e.g., aluminum or the like) and may be comprised of any number of turns 31. The turns 31 of the coil 30 may be in a helical structure wrapped around the ferrite core 20, with each end of the coil 30 being connected to a respective plate of the capacitor 40. To form the turns 31, the conductive material may be, for example, etched from a planar sheet of the conductive material into a plurality of angled traces that are wrapped around the core 20 to form the turn 31. The helical or spiral nature of the coil 30 may then be formed by connecting each turn 31 to an adjacent turn in series by, for example, crimping or welding, such as through welds 32, each turn 31 to an adjacent turn.

As mentioned above, the coil 30 may be connected, at each end of the coil 30, to a respective plate of the capacitor 40. With reference to FIG. 1A, the top or upper plate is viewable. The plates of the capacitor 40 may be connected to the ends of the coil 30 by welding or crimping to a lead, landing, or pad connected to the capacitor plate.

By connecting the capacitor 40 to the coil 30, an inductor-capacitor or LC circuit may be formed. The inductance of the coil 30 and the capacitance of the capacitor 40 may be selected to form a circuit that resonates in an electromagnetic field of a particular frequency, such as, for example, 8.2 MHz. By resonating in the field, the circuit and the label 10 may return an RF signal that may be detected by an antenna. As such, the label 10 may be employed as an EAS label, and for example, trigger an alarm to sound due to an apparent theft event of a product affixed to the label 10.

To tune the LC circuit for a particular frequency of operation, the structure of the capacitor 40 may be modified. In this regard, the area of the capacitor plates may be modified, for example via removal of material from the plates using, for example a laser or using a mechanical technique. A portion of the capacitor 40 area may be allocated for tuning (e.g., area 41). As can be seen in FIG. 1A, in area 41 some of the capacitor plate material has been removed to tune the circuit. It is noted, however, that some embodiments may comprise tighter or less variance in frequency of labels and may not require such tuning.

When the label 10 is used as a non-reusable product security device, the label 10 may require a means for deactivating the label 10 and the LC circuit. In this regard, deactivation typically involves changing the circuit or destroying the circuit's characteristics in such a way that either changes the resonant frequency from a target frequency so that the label 10 can no longer be detected by EAS antennas, or simply eliminate the circuit's ability to resonate at any frequency by destroying the dielectric layer between the plates of the capacitor 40. To facilitate destruction of the dielectric layer between the plates of the capacitor 40, a dimple 42 may be formed on the capacitor 40. The dimple 42 may be formed by creating a weak point in the dielectric (e.g., by a controlled crimp) that allows the capacitor 40 to continue to operate normally until the label 10 is subjected to a relatively high electromagnetic field which causes the dielectric to permanently break down at the dimple 42 location, thereby deactivating the label 10.

FIG. 1B illustrates a cross-section side view of the label 10. As can be seen, the core 20 may be comprised of a first ferrite layer 21, a spacer 22, and a second ferrite layer 23. The ferrite layers 21, 23 may be formed of any type of ferrous material, which may be a flexible ferrous material such as a soft ferrite material (e.g., temporarily magnetized material). The spacer 22 may be formed of any non-ferrous or conducive material. In some example embodiments, the spacer 22 may be a flexible member to give the label 10 an additional degree of flex (e.g., to facilitate for application of the label 10 to non-planar surfaces of a product packaging). In this regard, the spacer 23 may be formed of paper, or a paper like plastic. The cross-section of the core 20 may be provided in a number of different shapes, including, but not limited to, a rectangle, a square, a circle, or the like.

The core 20 may be wrapped with a dielectric layer 24, which may be disposed or placed at the core 20. It is noted that an adhesive layer 25 may form the gap between the plates of the capacitor 40. A conductive layer 33 may form the coil 30 and the lower plate 44 of the capacitor 40. The conductive layer 33 may adhere to the dielectric layer 24 via adhesive layer 26. To form the coil 30, each turn may be welded at a respective weld, such as weld 32. The upper plate 43 of the capacitor may be disposed on an opposite side of the dielectric layer 24 and held in place by the adhesive layer 25. The upper plate 43 of the capacitor 40 may also include the dimple 42. According to some example embodiments, the upper plate 43 may be comprised of a thinner conductor than the conductor used for the lower plate 44.

The label 10 may also include a top sheet 51, which may be added for aesthetic purposes or to include indicia, such as logos or text, on the top surface of the label 10. Further, the label 10 may include a product attach adhesive layer 50, which may, according to some example embodiments, be a hotmelt adhesive to facilitate affixing the label 10 to a retail product.

FIGS. 2A-2H illustrate label 10 various cross-sectional views of the label 10 in different states as it is manufactured according to exemplary methods. In view of the subject matter and views in FIGS. 2A-2H, a method that may be related to various embodiments may be better appreciated with reference to the flowchart of FIG. 3. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

First, a laminate may be provided at 200 and resist ink may be printed on the laminate at 205. Subsequently, a chemical etch may be performed at 206 on the laminate. Additionally, at 201 a bare core may be provided. The bare core may be mounted onto this liner at 202. Further, a method may include die cutting the core, the paper, and a laminate. At 207, the core may be mounted or re-pitched on the etched laminate.

In some embodiments, the method may not utilize a roll format preparation with a liner and adhesive for spotting on the etched coil circuit. For instance, embodiments may utilize direct dispensing of a core material chip in a sheet format instead of a roller format with a liner. It is noted that dispensed or spotted adhesive may be applied to an etched circuit prior to dispensing of the ferrite core.

Figure 2A:
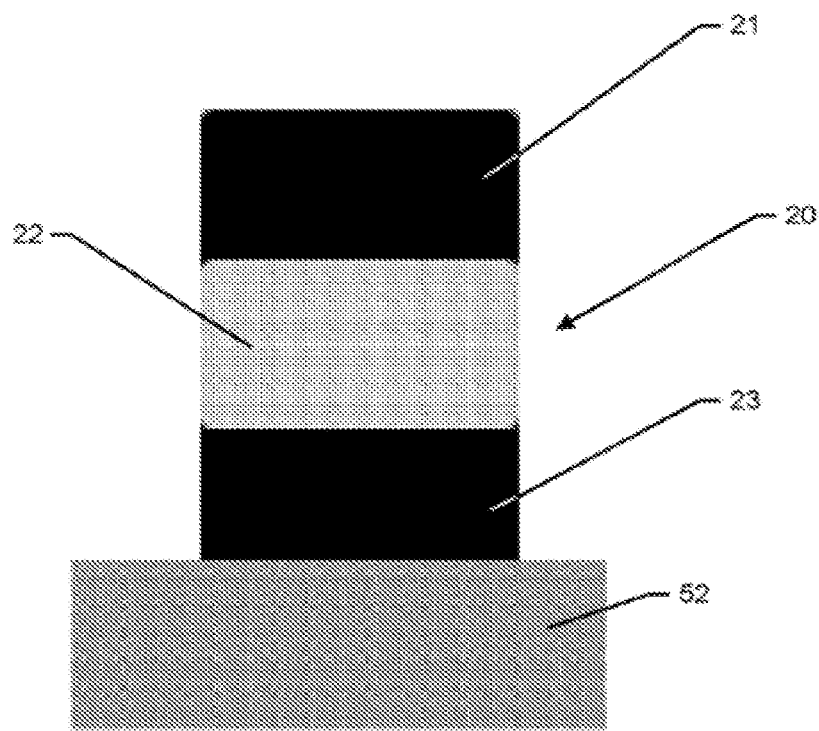
FIGS. 2A through 2H illustrate a cross-section view foldable label at various states of manufacture in accordance with various disclosed aspects.
Figure 3:
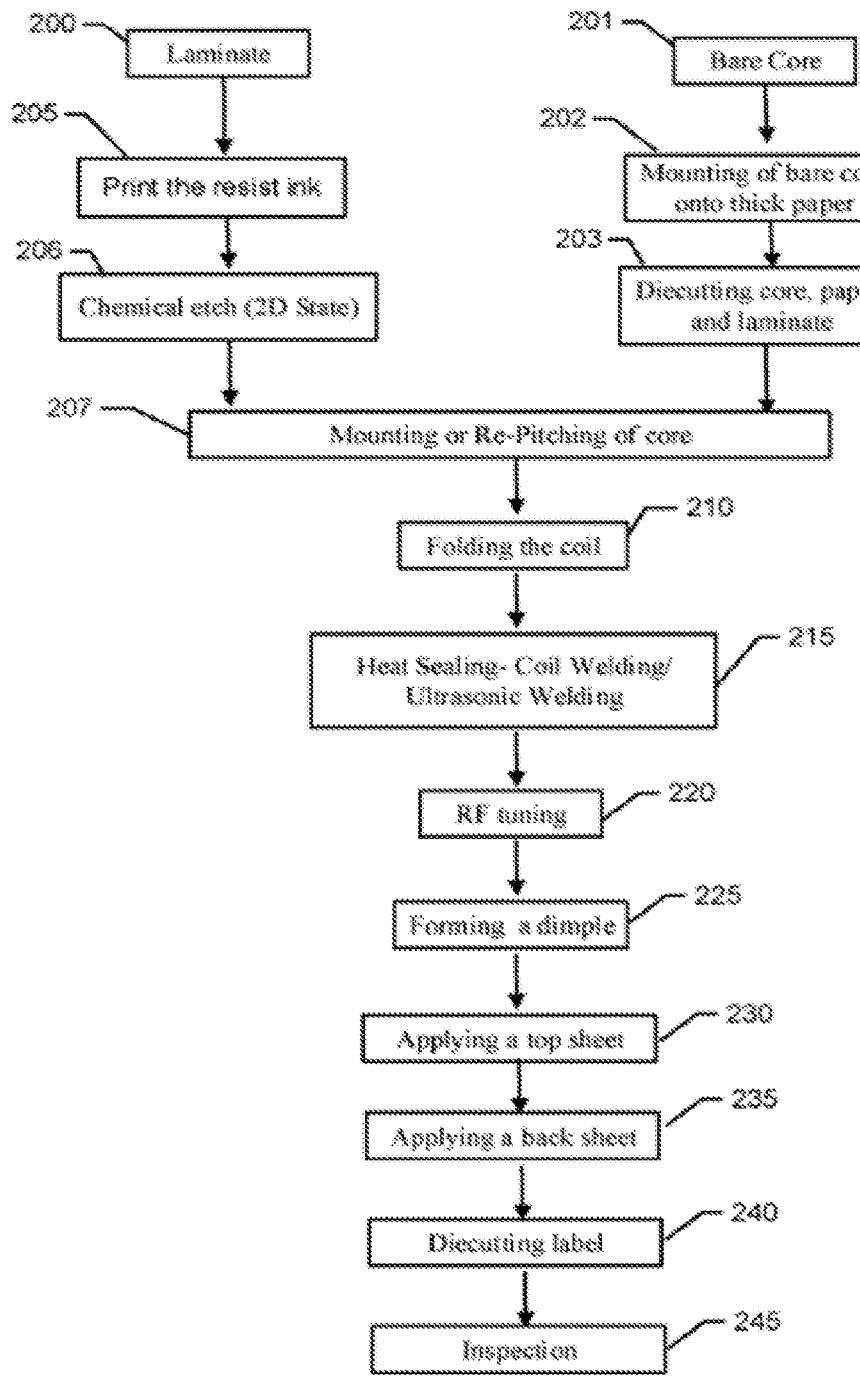
FIG. 3 is flow chart of an example method for making an example foldable label that describes the operations shown in FIGS. 2A through 2H, in accordance with various disclosed aspects.

With reference to FIG. 2A, the core 20 may be constructed, as indicated at 200 of FIG. 3. As previously explained, the core 20 may be constructed of a first ferrite layer 21, a spacer 22, and a second ferrite layer 23. According to some example embodiments, the core 20 may alternatively be formed as a layer of ferrite with a central spacer. Liner 52 may provide a base for the core 20 during construction of the core 20. As described in more detail below, other embodiments may comprise a core without a spacer.

Figure 2B:
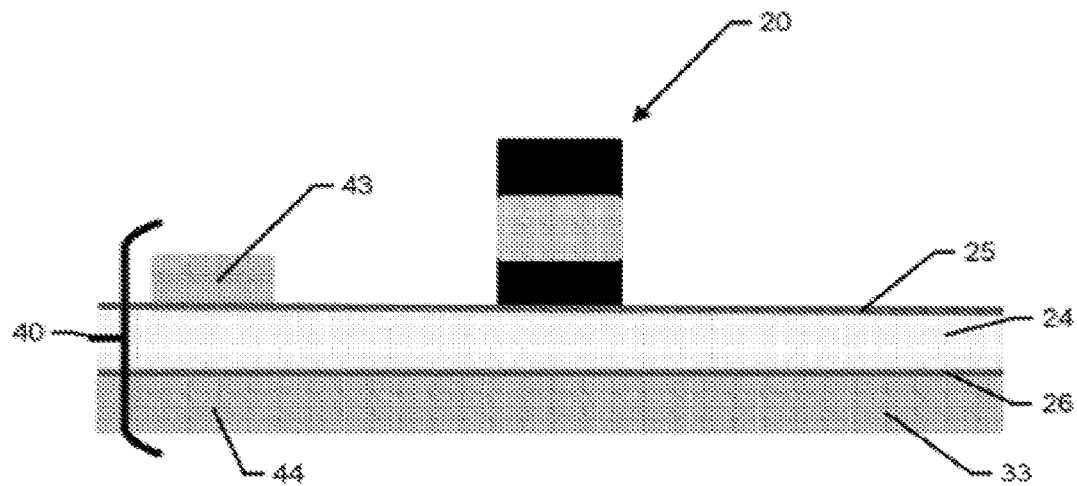

The core 20 may be laminated and the upper capacitor plate 43 may be added as shown in FIG. 2B. In this regard, the core 20 may be laminated to provide additional structural integrity to the core 20. A conductive layer 33, which may have been previously etched with angled traces for forming the turns of the coil 30, may be adhered, via adhesive layer 26, to a dielectric layer 24. The dielectric layer 24 may also have an upper adhesive layer 25 to which the upper capacitor plate 43 may be adhered. Similarly, the upper capacitor plate 43 may have been previously etched in place on the dielectric layer 24. The lower capacitor plate 44 may be a portion of the conductive layer 33. Additionally, the core 20 may be placed on the adhesive layer 25 to adhere the core to the dielectric layer 24.

Figure 2C:
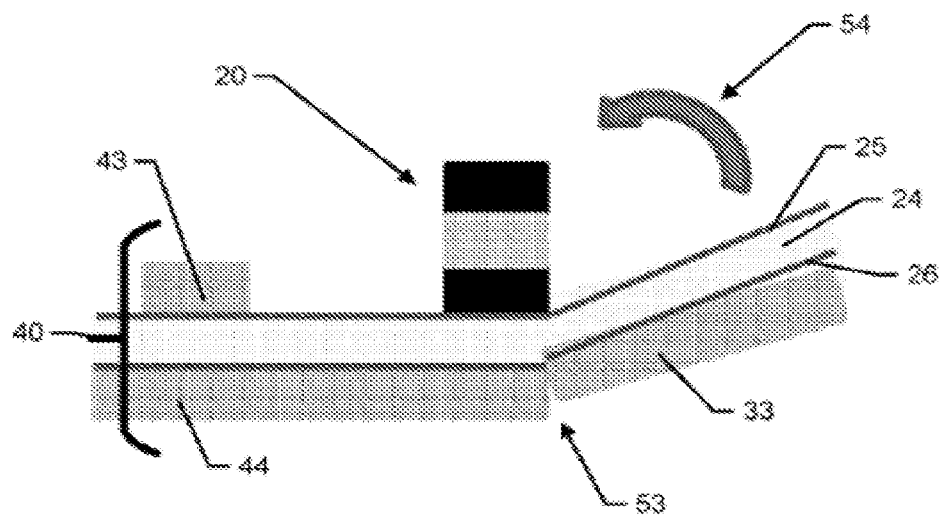

At 210, folding may be performed to form the coil as shown in FIG. 2C. A fold bar, mounting robot technology, or other technique may be used to cause a fold line 54 to form at an edge 53 of the core 20 to wrap the dielectric layer 24 and the conductive layer 33 around the core 20 to facilitate forming the coil 30. Prior to folding, the conductive layer 33 and the dielectric layer 24 may have been die cut to release a portion of the conductive layer 33 and the dielectric layer 24 for folding. The die cutting may be performed in association with register spotting, re-pitching, or the like.

Figure 2D:
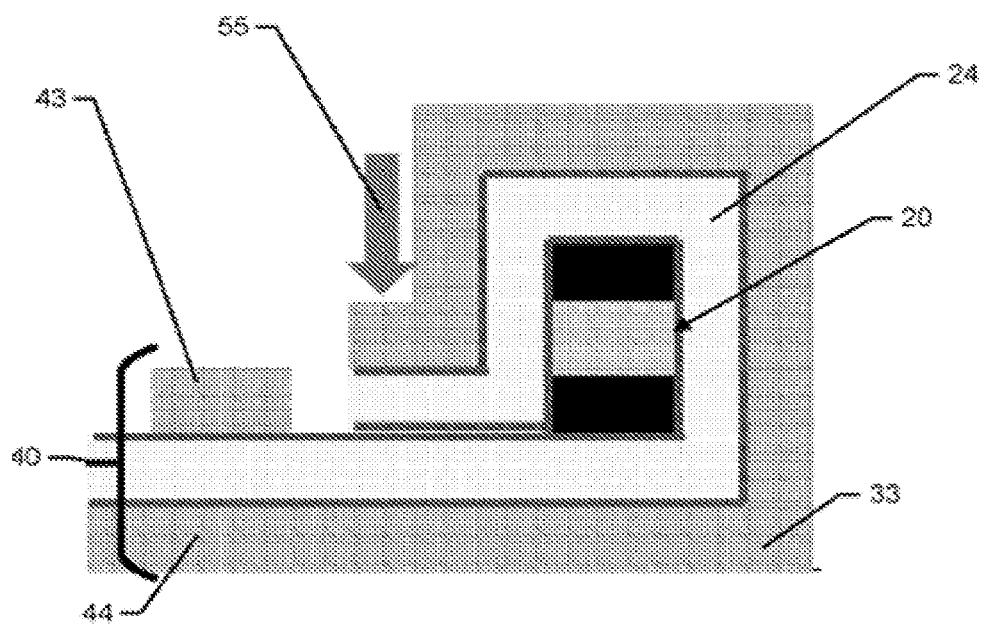
Figure 2E:
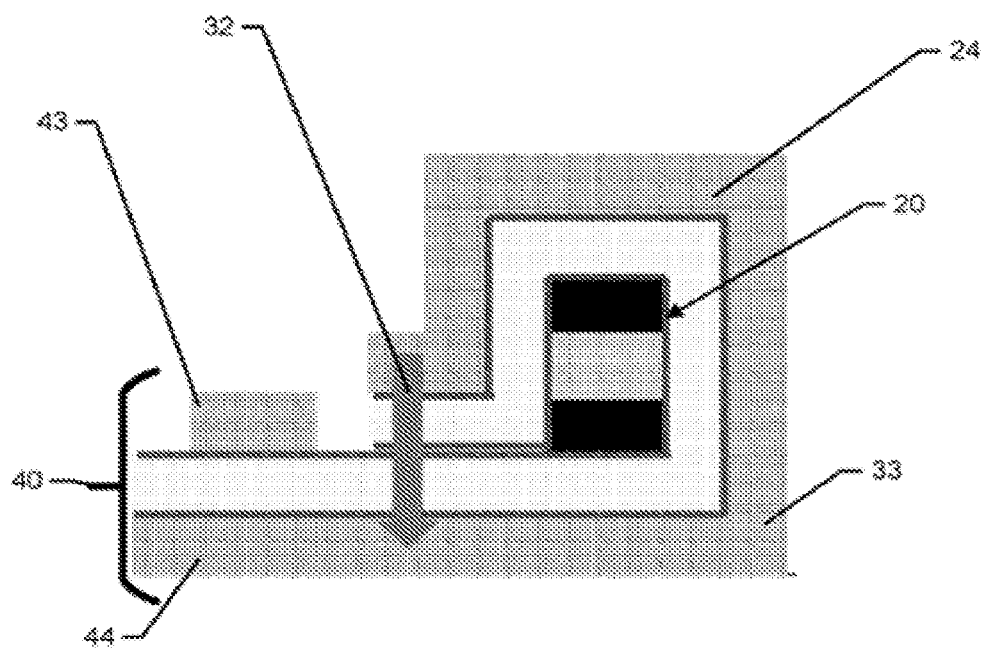

At 215, an ultra-sonic welding process may be performed as shown in FIG. 2D. The welding may be applied at terminal end 55 in preparation for welding to form the turns of the coil 30. The welding may provide temporary adhesion to hold the folded conductive layer 33 and dielectric layer 24 in position in preparation for welding. The coil welding may be performed to connect each turn 31 of the coil 30 in series to form a helical structure for the coil 30, as shown in FIG. 2E. The welding process may be performed at a connection location associated with each turn. In at least some alternative examples, a heat sealing conversion and welding process may be utilized. Welding may involve crimping, crushing, or melting and welding the structure at about position 32 for each turn to electrically and physically connect the wrapped upper portion of conductive layer 33 with the lower portion of conductive layer 33.

Figure 2F:
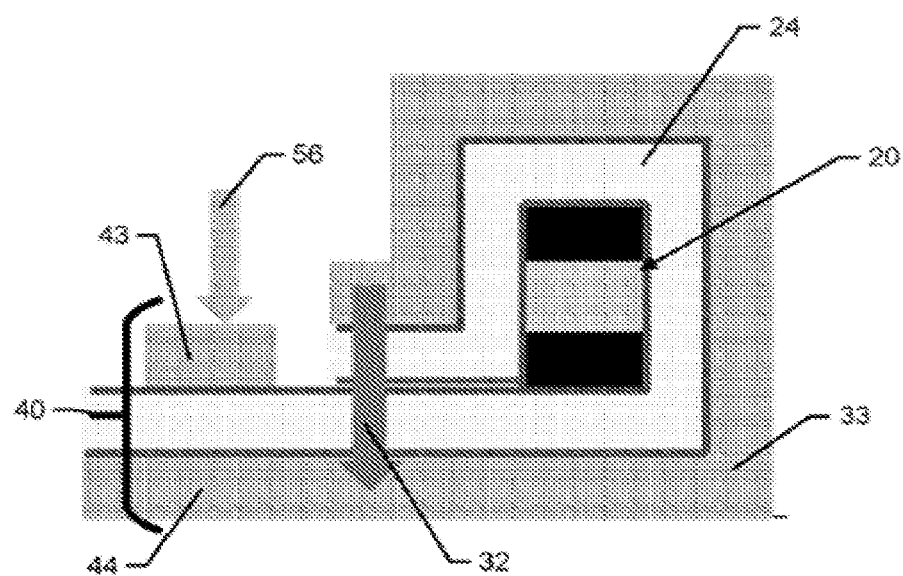
Figure 2G:
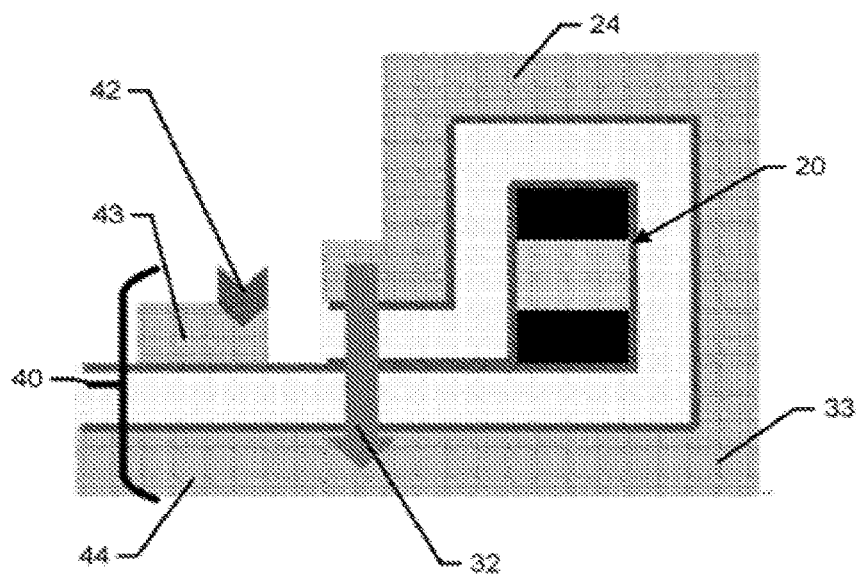

At 220, RF tuning may be optionally performed. It is noted that this RF tuning may be utilized during commercial production of the labels. For example, the RF tuning may be performed by modifying the area of the capacitor plates, as shown in FIG. 2F. RF tuning at about position 56 (e.g., proximal per capacitor plate 43) may be performed using a number of techniques to adjust the capacitance and tune the resonant frequency of the label 10. In this regard, the partially manufactured label may be subjected to an electromagnetic field to determine the resonant frequency of the LC circuit, and RF tuning may be performed to move the resonant frequency to a desired value. To change the resonant frequency, portions of the capacitor plates may be removed to change the capacitance through the removal or modification of the material of the capacitor plates using, for example, a laser.

If the label is deactivatable, then, at 225, a dimple 42 may be created on the capacitor 40. As described above, the dimple 42 may be made in a manner that weakens the dielectric layer 24 in the area of the dimple 42 to permit breakdown of the dielectric when the label is subjected to a relatively high electromagnetic field, thereby deactivating the label.

Figure 2H:
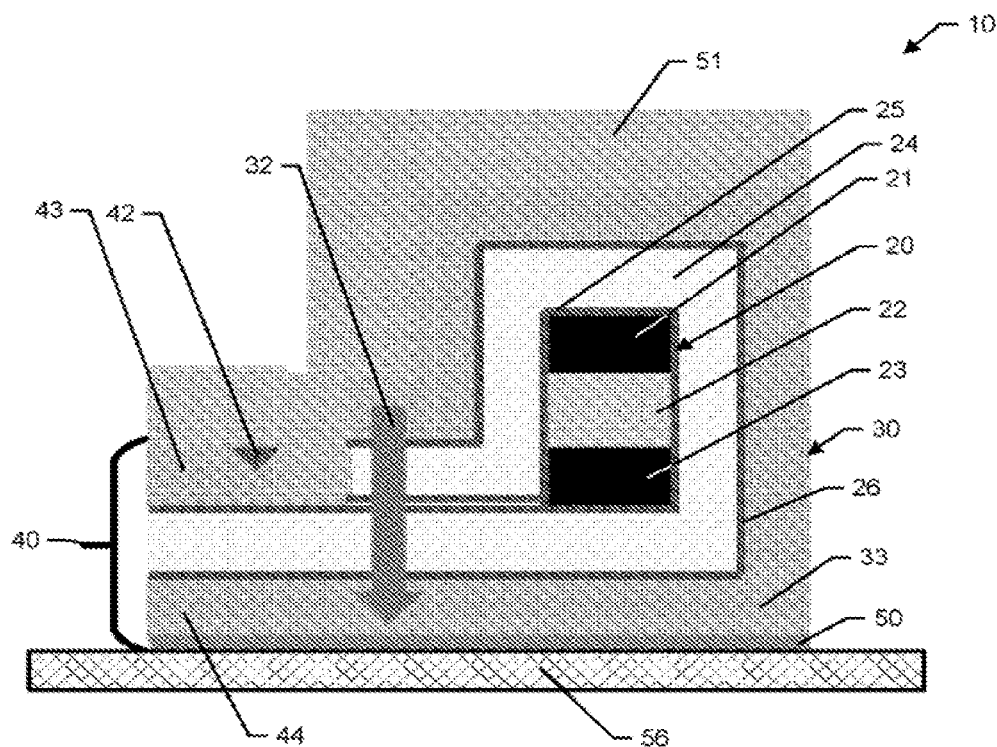

At 230, a top sheet 51 may be applied to the upper surface of the conductive layer 33, as shown in FIG. 2H. The top sheet 51 may be formed of, for example, paper to give the label 10 a clean and aesthetically pleasing look. The top sheet 51 may also operate to protect the features of the LC circuit (i.e., the capacitor 40, the coil 30, etc.) that may be accessible in the absence of the top sheet 51. A product attach adhesive layer 50 may also be added on a liner or lower surface of the conductive layer 33 that is used to affix the label 10 to a product. Further, the label 10 may be placed on a liner 56 of, for example a roll or a sheet, for packaging or shipping. The liner 56 may operate to protect the product attach adhesive layer 50 until the label 10 is ready to be applied to a product. This folded coil label can also provide a longer clear top sheet laminated due to extended pitch by folding at a repeat direction, which is helpful to create an enhanced tamper label for higher security level.

At 235, a back sheet may be applied and at 240, die cutting of the label may be performed. At 245, an inspection may be performed to test the label. The inspection may be done by a user, an automated process, or a combination of a user and automated machine. For instance, inspection of the resonant frequency may be performed by a manufacturer prior to shipping to a customer. It is noted that a number of sample labels may be tested from a larger set or batch of labels.

FIGS. 4A-4E will now be described, which illustrate the operations of forming a folded coil label from an overhead view according to some example embodiments. It is noted that the various views depicted in FIGS. 4A-4E may correspond to method 250 of FIG. 3. Moreover, it is noted that like named components of FIGS. 4A-4E and the other figures may comprise similar aspects.

Figure 4A:
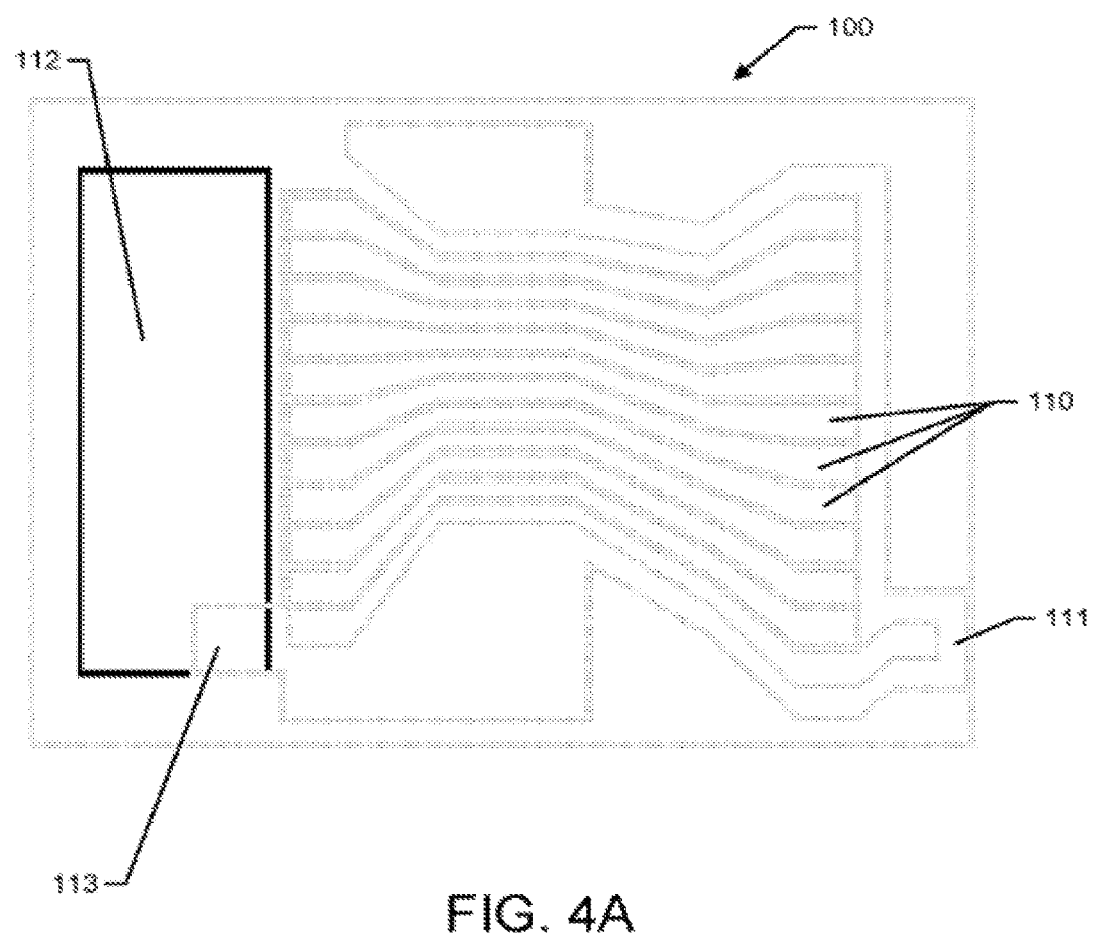
FIGS. 4A through 4E illustrate top views of a foldable label at various states of manufacture according to some example embodiments.

In FIG. 4A, an etched aluminum conductive layer is shown having traces 110, which become turns of a coil when the traces 110 are wrapped around a core to form an angled coil. The angles may allow for off-set areas between a ferrite core material and coil traces 110. It is noted that the orientation of the angles of traces 110 may be modified. As can be seen in FIG. 4A, the traces 110 are angled such that the ends of the traces 110 align with the adjacent traces 110 to form the coil when the traces 110 are folded. The pad 111 may be positioned to align with pad 113 for the capacitor 112 when the fold is performed for connecting one end of the coil to the capacitor 112. Pad 113 may also be positioned to engage with a pad for connecting to the capacitor on the other capacitor plate. The capacitor 112 and the traces 110 may be constructed during a resist ink printing and etching operations.

Figure 4B:
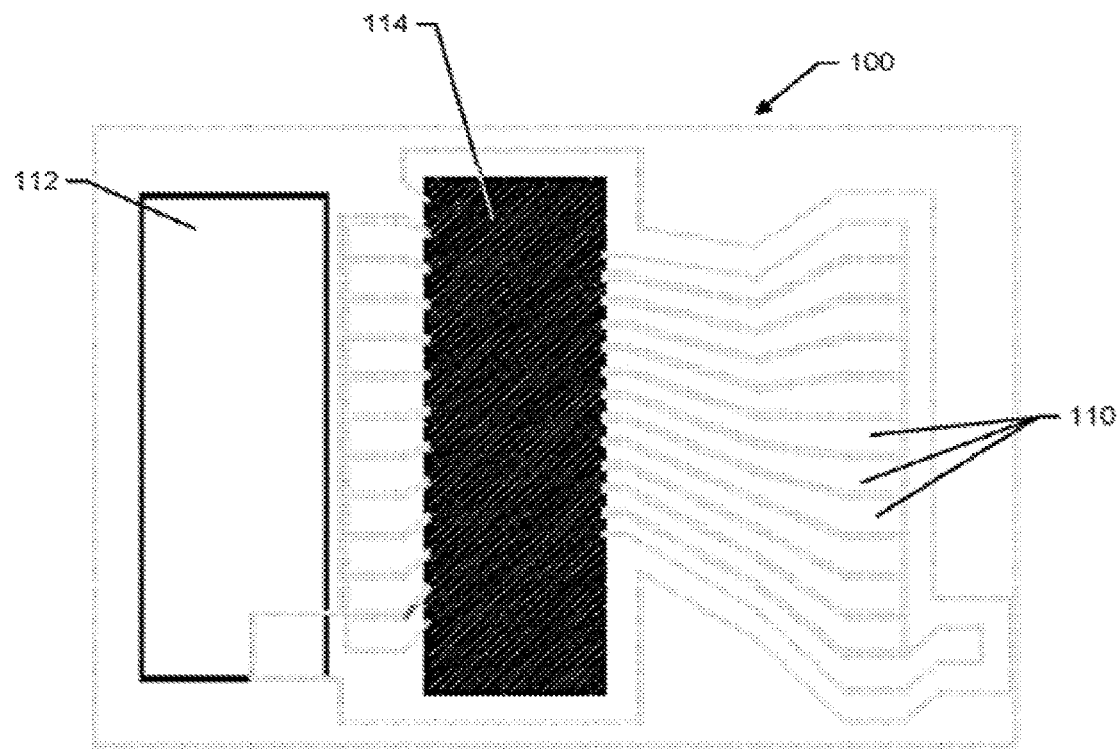
Figure 4C:
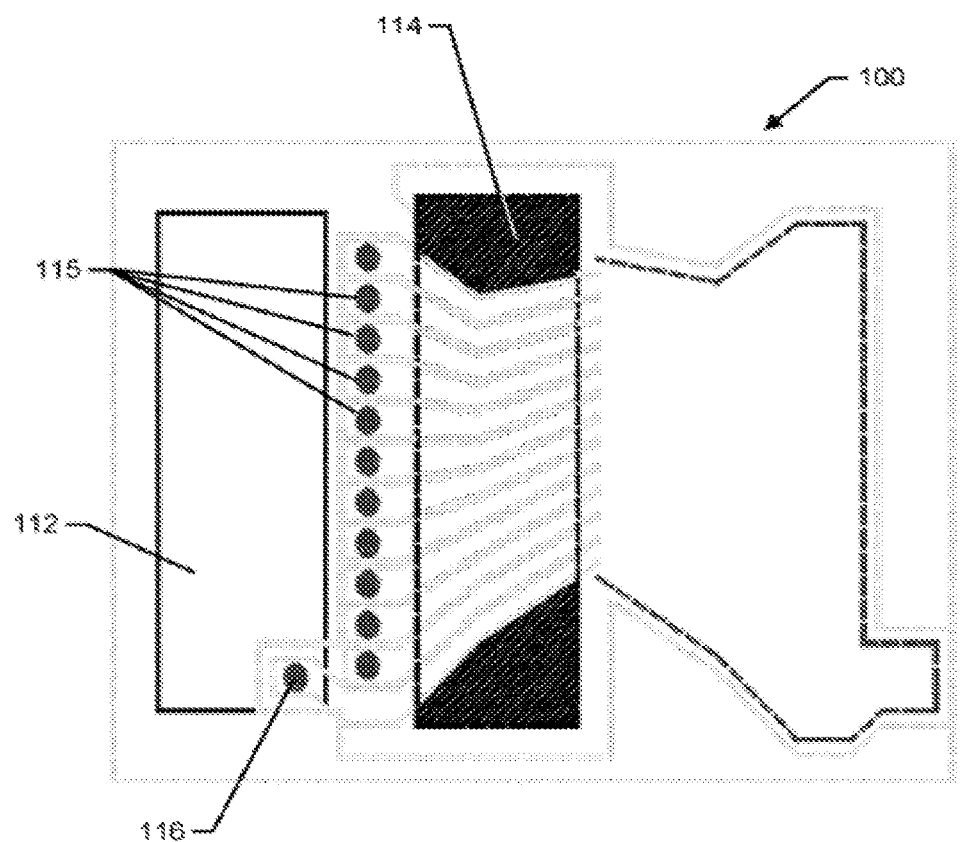
Figure 4D:
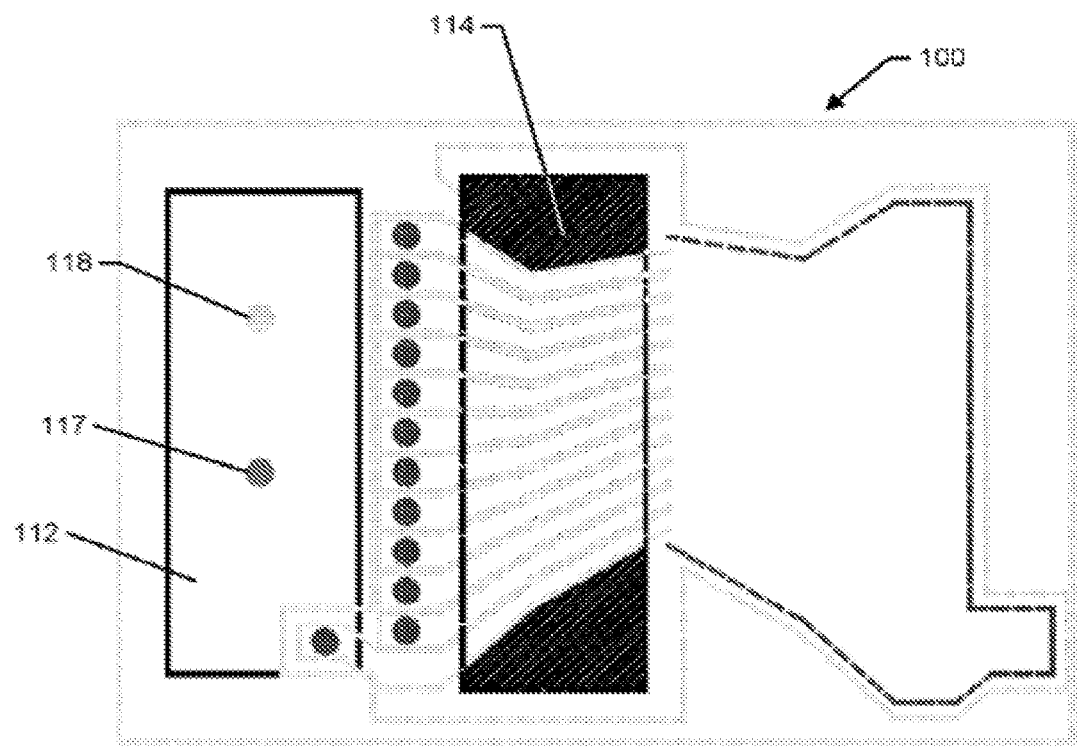
Figure 4E:
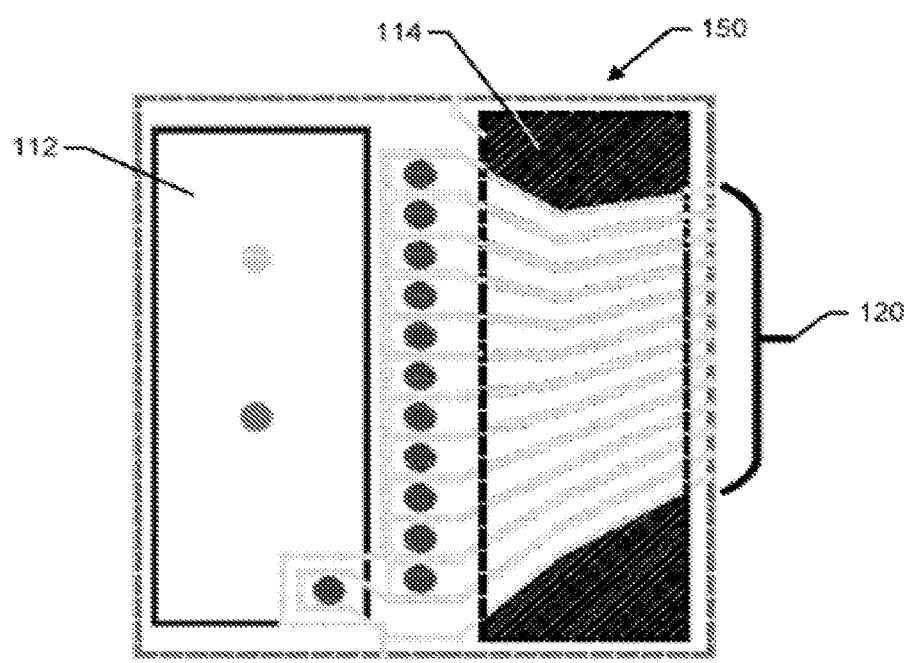

Referring now to FIG. 4B, a core 114 (e.g., the same or similar to the core 20) is located beneath the traces 110. At FIG. 4C, the traces 110 have been die cut along their edge and the traces 110 have been folded up and over the core 114. Welds 115 may be made to connect the traces 110 to form turns (e.g., turns 31) of a coil (e.g., coil 30). Weld 116 may be made to connect the coil to the capacitor 112. At FIG. 4D, RF tuning may be performed on the capacitor 112 at location 118 and a dimple 117 may be added to the capacitor 112. At FIG. 4E, the remaining conductive layer and dielectric layer may be cut away by another die cut to form the label 150. As shown in FIG. 4E, the coil 120 may be formed by connections between the traces 110, which form turns of the coil 120.

Figure 5A:
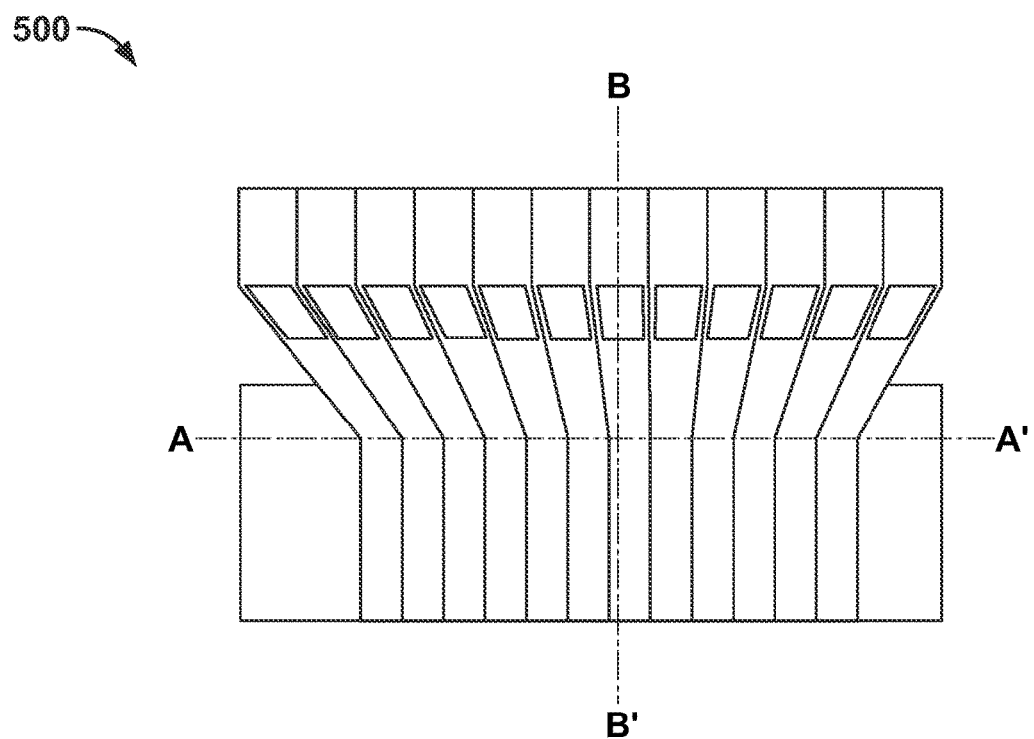
FIGS. 5A through 5C illustrate a foldable label with a metal insert layer from a top view, a cross-sectional view along line B-B', and a cross-sectional view along line A-A', respectively, in accordance with various disclosed aspects.
Figure 5B:
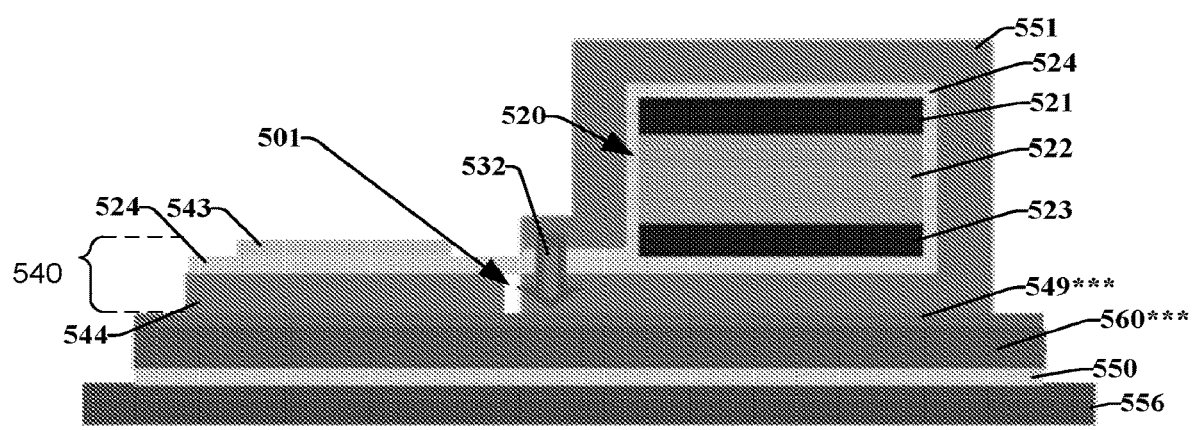
Figure 5C:
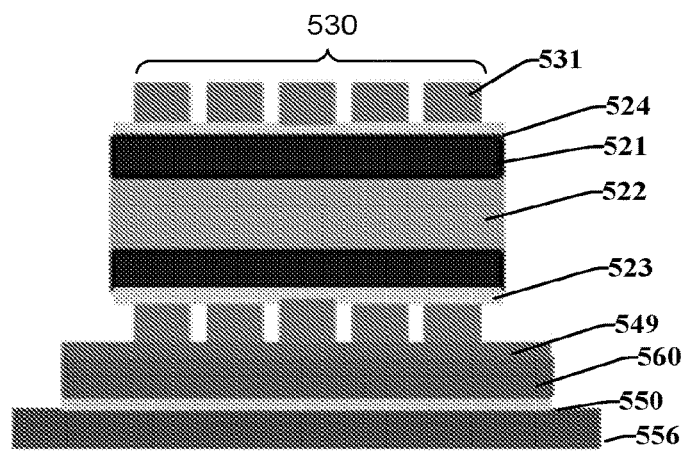

Turning now to FIGS. 5A-5C, a foldable label 500 comprising a metal layer disposed between a coil and liner. It is noted that like named components of foldable label 500 and various other disclosed labels (e.g., label 10, etc.) may comprise similar aspects. The metal layer may comprise an aluminum foil that may comprise a frequency compensator that may boost detection performance of a detectable folded coil. As described herein, the thickness of the metal layer may be between 40-80 microns.

Foldable label 500 may comprise a ferrite core 520 comprising a first ferrite layer 21 and a second ferrite layer 23 spaced apart from each other by a spacer 522. The spacer 522 may comprise a non-ferrous or conductive material. A dielectric layer 524 may envelope all or a portion of the ferrite core 520. A sheet 551 may envelope all or a portion of the dielectric layer 524 or ferrite core 520. The sheet 551 may comprise a relative thick aluminum forming a coil 530. The coil 530 may include a number of rungs or turns 531. As described here as well as elsewhere in this disclosure, the turns 531 may be connected to adjacent turns in series by, for example, crimping or welding, such as through welds 532.

A capacitor 540 may be disposed proximal the coil 530. For instance, the capacitor 540 may be formed next to the coil 530 on a back film 549 and may be separated by a space 501. The dielectric layer 524 may be disposed between a top plate 543 of the capacitor 540 and a bottom plate of the capacitor 544. The top plate 543 and bottom plate 544 may comprise a metal layer, such as an aluminum layer. In an example, the top plate 543 may comprise a layer of aluminum or other metal that is generally thinner than the bottom plate 544. In some embodiments, the bottom plate 544 may comprise a similar thickness as the sheet 551.

A metal layer 560, such as an aluminum layer, may be disposed underneath the coil 530 and capacitor 540, such as beneath the back film 549. The metal layer 560 is then adhered to a liner 556 with an adhesive or hotmelt 550. It is noted that the metal layer 560 may increase the ability of foldable label 500 to be detected in accordance with various embodiments.

Figure 6A:
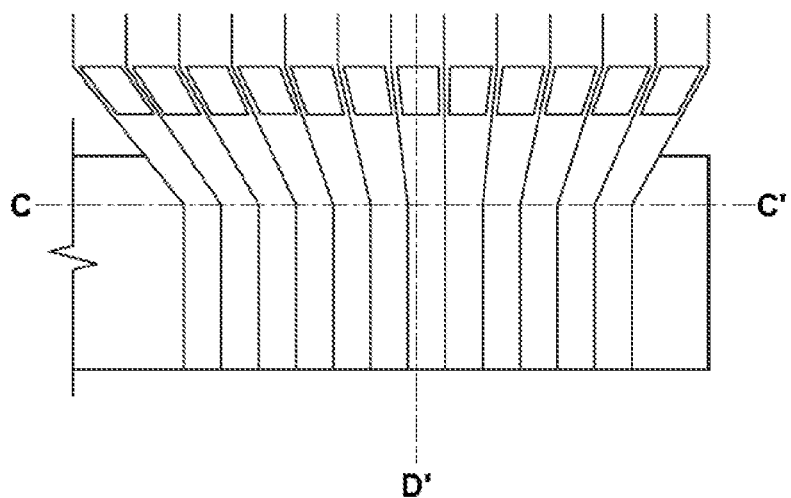
FIGS. 6A through 6C illustrate a foldable label without a metal insert layer from a top view, a cross-sectional view along line D-D', and a cross-sectional view along line C-C', respectively, in accordance with various disclosed aspects.
Figure 6B:
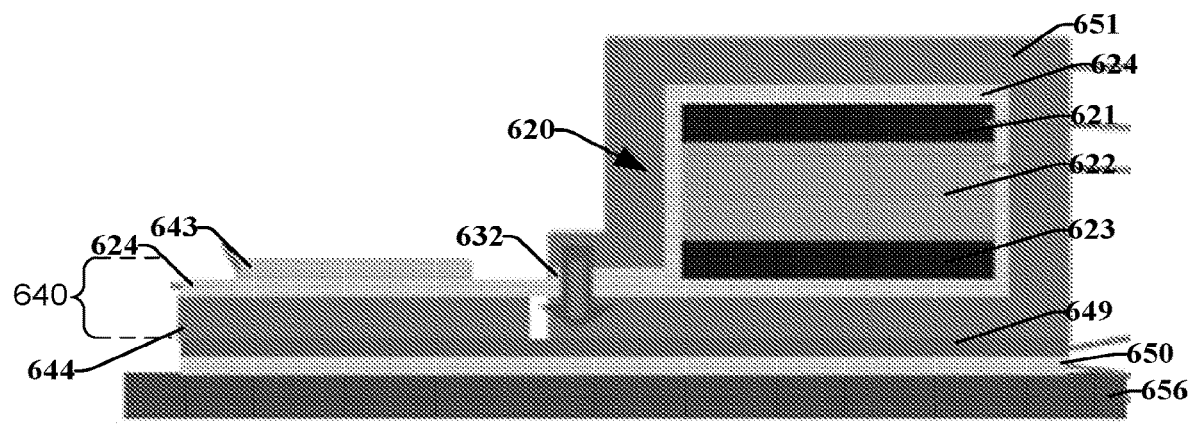
Figure 6C:
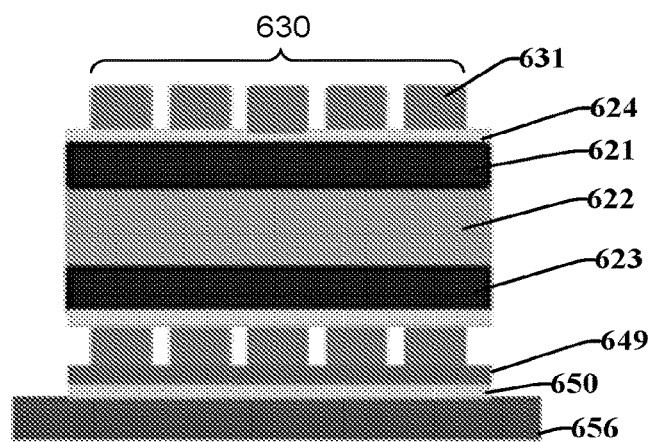

For instance, FIGS. 6A-6C illustrate a foldable label 600 having similar aspects to foldable layer 500, except for metal layer 560. It is noted that like named components of foldable label 600 and various other disclosed labels (e.g., foldable label 10, 500, etc.) may comprise similar aspects. The foldable label 600 may generally include a ferrite core 20 comprising a first or top ferrite layer 621 and a second or bottom ferrite layer 623. A spacer 622 may be disposed between the top ferrite layer 621 and bottom ferrite layer 623. The core may be wrapped by a dielectric layer 24. A metal layer 651 may form a coil 630 having turns 631 around the ferrite core 620 and dielectric layer 624. Welds 623 may couple the turns 631 together to form a helical coil. A capacitor 640 is formed adjacent to the coil 630 on a back film 649. The back film 649 may be adhered to a liner 656 via an adhesive, such as a hotmelt 650.

The capacitor 640 may comprise a top plate 643 and a bottom plate 644 disposed on either side of the dielectric layer 624. The capacitor 640 and coil 630 may form an LC circuit/antenna that is tuned to resonant at a particular frequency such as about 8.2 MHz with some variance e.g., +/−5%. The foldable label 600 may be adhered to a product, such as a metal product, and may be detectable by an EAS device. By resonating in the field, the foldable label 600 may be excited by a signal emitted by an EAS device at the particular frequency so that it may be detected by an antenna. As such, the foldable label 600 triggers an alarm to sound due to an apparent theft event.

Figure 7A:
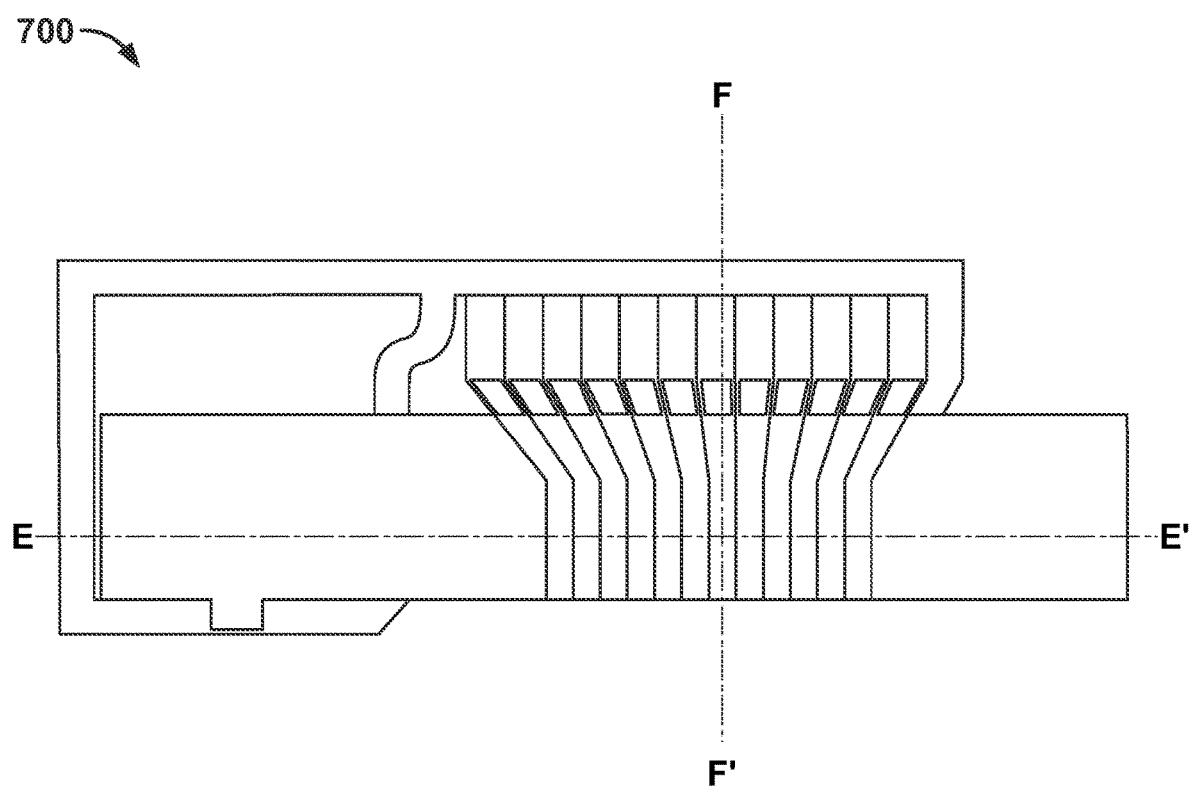
FIGS. 7A through 7C illustrate a foldable label with a capacitor beneath a coil from a top view, a cross-sectional view along line F-F', and a cross-sectional view along line E-E', respectively, in accordance with various disclosed aspects.
Figure 7B:
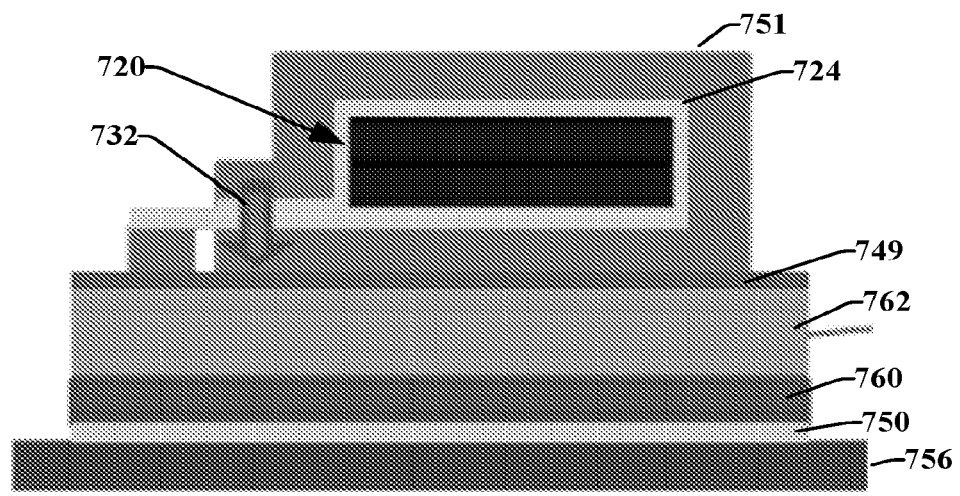
Figure 7C:
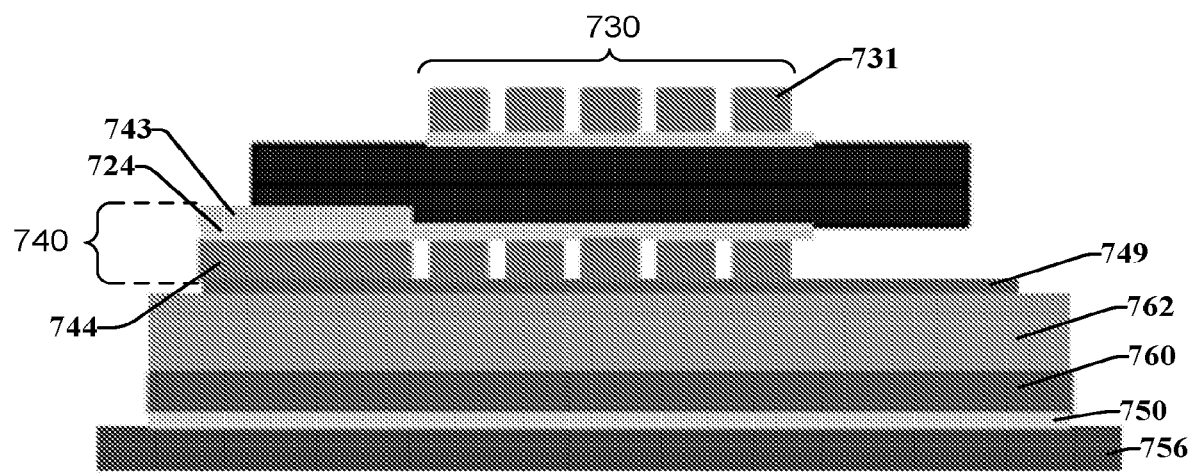

FIGS. 7A-7C illustrate a foldable label 700 comprising a ferrite core that is extended, in comparison to some other disclosed embodiments, and a capacitor plate located underneath the ferrite core. It is noted that like named components of foldable label 700 and various other disclosed labels (e.g., foldable label 10, 500, 600 etc.) may comprise similar aspects In an aspect the foldable label 700 may minimize or reduce the length of the repeat direction even when a spacer and metal layer are disposed underneath a coil and capacitor.

The coil 730 may be formed of turns 731 (which may be welded together at welds 732) that define a metal layer 751 of the foldable label 700. A ferrite core 720 is disposed within a dielectric layer 724 and the metal layer 751. As described herein, the capacitor 740 may be disposed generally beneath the ferrite core 720. For instance, a top plate 743 of the capacitor 740 may be disposed underneath or at a bottom of the ferrite core 720. The top plate 743 is disposed above a portion of the dielectric layer 724 and the bottom plate 744. As such, the capacitor 740 and coil 720 may form an LC circuit. The LC circuit may be disposed on a back film 749. The back film 749 may be attached to a bottom spacer 762. A metal layer 760 (e.g., aluminum layer) may be disposed beneath the spacer 749. The metal layer 760 may be adhered to a liner 756 via a hotmelt 750 or other adhesive.

The spacer 762 provides a greater distance of separation of the coil 730 or core 720 from a metal surface, such as the metal layer 760 or a metal product. In an aspect, the thickness of the spacer 762 may be selected based on cost, function, or both cost and function. In examples, the spacer may comprise a synthetic paper having a mass per unit area of between about 160 to 500 g/m$^2$ (such as 160-300, or 300-500 g/m$^2$). It is noted that the specifications of the spacer 762 and arrangement of the other components of the foldable label 700 may be selected to allow for an improved detectable label when adhered to a metal item.

FIGS. 8A-8C illustrate a foldable label 800 comprising a ferrite core that is extended, in comparison to some other disclosed embodiments, and a capacitor located adjacent to the ferrite core. It is noted that like named components of foldable label 800 and various other disclosed labels (e.g., foldable label 10, 500, 600, 700 etc.) may comprise similar aspects In an aspect the foldable label 800 may minimize or reduce metal shielding areas and may include an extended repeat direction via the ferrite core.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A foldable label comprising:
   a core wherein the core comprises a spacer layer;
   a capacitor comprising a dielectric layer disposed between
      a top plate and a bottom plate; and an inductor engaged with the core and connected to the capacitor to form a resonant circuit;

wherein the inductor is formed of angled traces folded around the core to form turns such that each turn is electrically and physically connected in series to an adjacent angled turn to form a helical structure of the inductor.

2. The foldable label of claim 1, wherein the core comprises at least one ferrite layer.

3. The foldable label of claim 2, further comprising a dimple formed on the capacitor.

4. The foldable label of claim 2, wherein the spacer layer comprises a non-conductive or ferrous flexible member.

5. The foldable label of claim 1, further comprising a liner, wherein the resonant circuit is disposed above the liner.

6. The foldable label of claim 5, further comprising at least one metal layer disposed between the liner and the resonant circuit.

7. The foldable label of claim 6, wherein the at least one metal layer comprises a thickness between about 40-80 microns.

8. The foldable label of claim 6, wherein the at least one spacer layer is disposed between the liner and the resonant circuit.

9. The foldable label of claim 8, wherein the at least one spacer layer comprises a mass per unit area of between about 160 to 500 g/m².

10. The foldable label of claim 5, wherein the at least one spacer layer disposed between the liner and the resonant circuit.

11. The foldable label of claim 5, wherein at least a portion of the top plate is disposed between the core and the liner.

12. The foldable label of claim 5, wherein a space between the resonate circuit and the liner is free of metal.

13. The foldable label of claim 5, wherein a space between the resonate circuit and the liner is free of metal and the core is free of metal, such that the label comprise no metal other than the inductor.

14. The foldable label of claim 1, wherein the resonate circuit comprises a laser tuned resonant circuit.

15. A foldable label comprising:
a core;
a capacitor comprising a dielectric layer disposed between a top plate and a bottom plate;
an inductor having angled traces that are folded and welded around the core and connected to the capacitor to form a resonant circuit, wherein the angled traces are positioned at an angle in either or both directions toward a center of the core or away from the center of the core;
a liner disposed beneath the resonant circuit at least one spacer layer disposed between the liner and the resonant circuit; and
at least one metal layer disposed between the liner and the resonant circuit, wherein the at least one metal layer comprises a thickness between about 40-80 microns.

16. The foldable label of claim 14, wherein the bottom plate is coplanar with a bottom of the inductor.

17. The foldable label of claim 15, wherein the capacitor is horizontally adjacent to the coil.

18. A foldable label comprising:
a resonant circuit comprising:
a core comprising a ferrite material;
a capacitor comprising a dielectric layer disposed between a top plate and a bottom plate;
an inductor comprising angled traces that sandwich around the core, and welds operatively coupled adjacent angled traces together to form a generally helical shaped coil;
a liner disposed beneath the resonant circuit;
at least one spacer layer disposed between the liner and the resonant circuit; and
at least one metal layer disposed between the liner and the resonant circuit.

19. The foldable label of claim 18, wherein the top plate is disposed below the core.

20. The foldable label of claim 18, wherein the bottom plate is disposed below the core.

21. The foldable label of claim 18, wherein the dielectric layer forms at least a portion of the inductor.

22. The foldable label of claim 1, wherein the core is mechanically flexible.

\* \* \* \* \*